United States Patent

[11] 3,613,801

| | | |
|---|---|---|
| [72] | Inventor | Robert Richard Roth<br>Rock Island, Ill. |
| [21] | Appl. No. | 36,141 |
| [22] | Filed | May 11, 1970 |
| [45] | Patented | Oct. 19, 1971 |
| [73] | Assignee | Deere & Company<br>Moline, Ill. |

[54] IMPLEMENT CARRIER
6 Claims, 2 Drawing Figs.

[52] U.S. Cl.................................................. 172/456,
172/482, 172/491, 280/490
[51] Int. Cl.........................................................A01b 63/32,
A01b 63/10
[50] Field of Search........................................... 172/491,
456, 494, 311, 315, 316, 482, 452, 668, 466, 485,
321, 326, 675; 280/490, 479

[56] References Cited
UNITED STATES PATENTS

| | | | |
|---|---|---|---|
| 3,091,296 | 5/1963 | Lohrman et al. ............. | 172/456 |
| 2,973,818 | 3/1961 | Marvin ......................... | 172/456 |
| 2,605,686 | 8/1952 | Starr............................. | 172/466 |

*Primary Examiner*—Robert E. Pulfrey
*Assistant Examiner*—Stephen C. Pellegrino
*Attorneys*—H. Vincent Harsha, Harold M. Knoth, William A. Murray, John M. Nolan and Raymond L. Hollister ABSTRACT: An agricultural implement having a tool-supporting drawbar pivotally carried on a draft frame for movement about a transverse axis between a lowered groundworking position and raised field and road transport positions. An extensible and retractable hydraulic cylinder is connected to a drawbar through a lever arm and pivoted links to move the drawbar about the transverse axis to the field transport position upon full extension of the hydraulic cylinder. A releasable locking means is provided to fixedly secure one of the links to the lever arm to form an extension of the lever arm so that upon full extension of the hydraulic cylinder the drawbar is moved about the transverse axis to the road transport position.

PATENTED OCT 19 1971 3,613,801

INVENTOR.
ROBERT RICHARD ROTH 3,613,801

IMPLEMENT CARRIER

BACKGROUND OF THE INVENTION

The present invention relates generally to agricultural implements, and more particularly relates to folding drawbars carried on wheeled carts and supporting a plurality of earth-working tools such as rotary hoe units, spring-tooth harrow sections, or spike-tooth harrow sections.

In agricultural implements of the above-mentioned type, the folding drawbar is pivoted to the cart or draft frame for movement about a transverse axis to raise the implements to varied heights above the ground. For example, when the drawbar is rotated through 45°, the tools carried thereby are raised to a field transport position for turning, crossing waterways, and clearing trash. It is also possible to transport the implement when in this position, but as a practical matter, the drawbar is too wide to go through gates or along roadways. However, when the drawbar is rotated through 90° to a road transport position, the outer ends of the drawbar can be folded either forwardly or rearwardly to reduce the width of the implement.

The drawbar is pivoted about the transverse axis by a hydraulic cylinder mounted on the draft frame and connected to a lever arm pivotally mounted on the draft frame. The lever arm is connected to a rock arm on the folding drawbar. Implements of this type which have enjoyed commercial success are illustrated in U.S. Pat. No. 3,091,296, which issued May 28, 1963 to W. V. Loerman et al. and U.S. Pat. No. 3,021,908, which issued Feb. 20, 1962 to P. A. Dlugosch. In both of the implements illustrated in the noted patents, provision has been made for adjustment of the lift linkage so that when the linkage was in one condition full extension of the hydraulic cylinder would rotate the drawbar through 45° to the field transport position, and when the linkage was in a second condition full extension of the hydraulic cylinder would rotate the drawbar through 90° to the road transport position. However, in the prior art implements the procedure of changing the linkage from one condition to the other has been too complicated and time consuming.

SUMMARY OF THE INVENTION

The principal object of the present invention is to provide an improved cylinder actuated hydraulic lift system for an implement carrier having a tool-supporting drawbar connected to a draft frame for moving about a transverse axis, which hydraulic lift system includes a simplified adjustment for optionally moving the drawbar to a field transport position or a road transport position upon full extension of the hydraulic cylinder.

An additional object of the invention is to provide a new and improved lift system for a tool-supporting frame pivotally connected to a draft frame for movement about the transverse axis, the lift system including a lever arm pivotally mounted on the draft frame, a rock arm secured to the tool-supporting frame, a first link pivotally connected to the rock arm, a second link pivotally connected to the lever arm and the first link, a hydraulic cylinder connected between the draft frame and lever arm, and releasable means to optionally and rigidly secure the second link to the lever arm to form an extension thereof.

The above objects and additional objects and advantages of the present invention will become apparent along with the details of construction of the preferred embodiment of the invention from a reading of the following detailed description when taken in conjunction with the accompanying drawings.

DESCRIPTION OF THE PREFERRED EMBODIMENT

Figure 1:
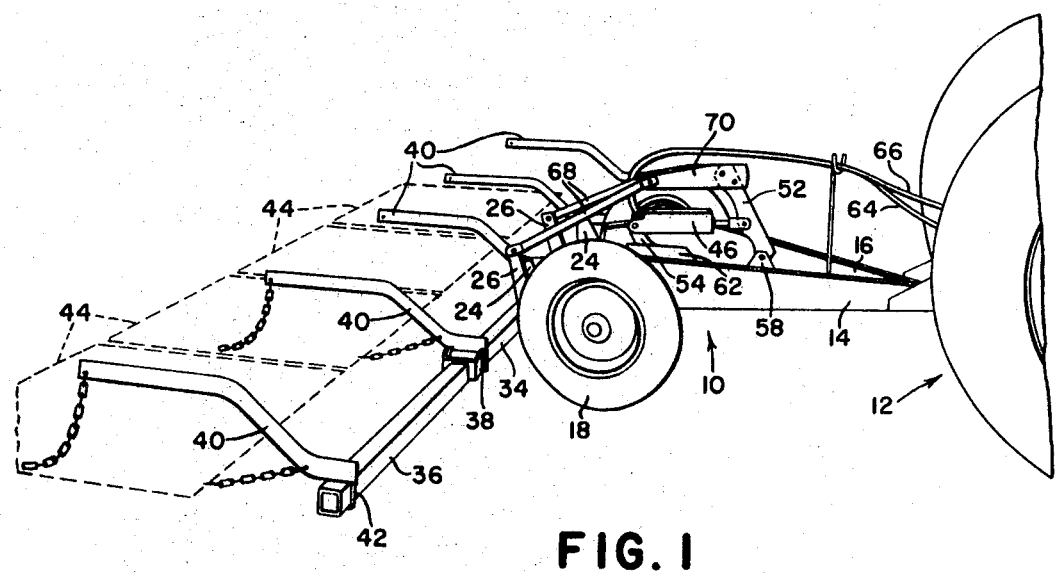
FIG. 1 is a perspective view of an implement carrier embodying the lift system according to the present invention.

Referring to FIG. 1 of the drawings, an implement carrier which includes the lift system according to the present invention is indicated generally at 10, and is illustrated as being attached to a tractor 12. The implement carrier includes a cart or draft frame made up of a pair of rearwardly diverging frame member 14 and 16 which are joined together at their forward ends and provided with a suitably hitch for connection with the tractor drawbar. The rear end of the frame members 14 and 16 are supported by wheels 18. The wheels 18 are mounted on axles 20 which are adjustably secured between a pair of abutting channel members 22 which extend between and rigidly interconnect the side frame members 14 and 16.

A pair of brackets 24 are rigidly secured to and project rearwardly from the ends of the frame members 14 and 16, and a second pair of brackets 26 are pivotally secured to the brackets 24 by pivot pins 28. The brackets 26 are provided with transversely extending flanges 30 which are suitably apertured to receive U-bolts 32 which serve to secure a tool bar 34 to the brackets 26. The brackets 26 are also provided with upward extensions which form rock arms for pivoting the brackets 26 and tool bar 34 about a transverse axis formed by the pivot pins 28 between a normal working position illustrated in FIG. 1, a field transport position illustrated in full lines in FIG. 2, and a road transport position illustrated in broken lines in FIG. 2. The brackets 24 are also provided with upward extension forming stop members which will engage the tool bar 34 when the tool bar has been moved to its road transport position to prevent excess movement of the tool bar 34.

A pair of extension bars 36 are pivotally connected to the opposite ends of the tool bar 34 by hinges 38. The illustrated hinges 38 are of conventional design, and when the drawbar 34 is in the working position they have abutting faces which maintain the extension bars 36 in alignment with the drawbar 34. However, if the extension bars 36 were provided with gauge wheels, the hinges 38 could be replaced with hinges which would permit the extensions 36 to pivot to both sides of alignment with the drawbar 34 so that the extensions would follow the ground contour. A plurality of support arms 40 are secured to the tool bar 34 and extension bars 36 by U-bolts 42. The support arms 40 extend rearwardly from the tool bar 34 and extension bars 36 when in the working position and a plurality of earth working tools 44 are suspended from the support arms 40. The tools 44 can be any type of earth working tools, such as rotary hoe units, peg-tooth harrow sections, and spring-tooth harrow sections.

The tool bar 34 can be rotated between its working and transport positions by a double-acting extensible and retractably hydraulic cylinder 46 which has its rod end 48 and its anchor end 50 secured to a lever arm 52 and a fixed arm 54, respectively. A pin 56 pivotally mounts the lower end of the lever arm 52 to a bracket 58 which is secured to the cart frame member 14 and 16 in any suitably manner. A pair of bolts 60 rigidly secure the fixed arm 54 between a pair of brackets 62 which are fixedly secured to the cart frame members 14 and 16 in any suitably manner. The hydraulic cylinder 46 is interconnected with the conventional fluid pump and reservoir on the tractor 12 by fluid lines 64 and 66. The upper end of the lever arm 52 is interconnected with the extensions of the brackets 26 by a pair of first links 68 and a second link 70. The links 68 have their rear ends pivotally connected to the brackets 26 by pins 72, and have their forward ends pivotally connected to one end of the second link 70 by a pin 74. The second link 70 is also pivotally connected remotely from its second end to the lever arm 52 by a pin 76.

Figure 2:
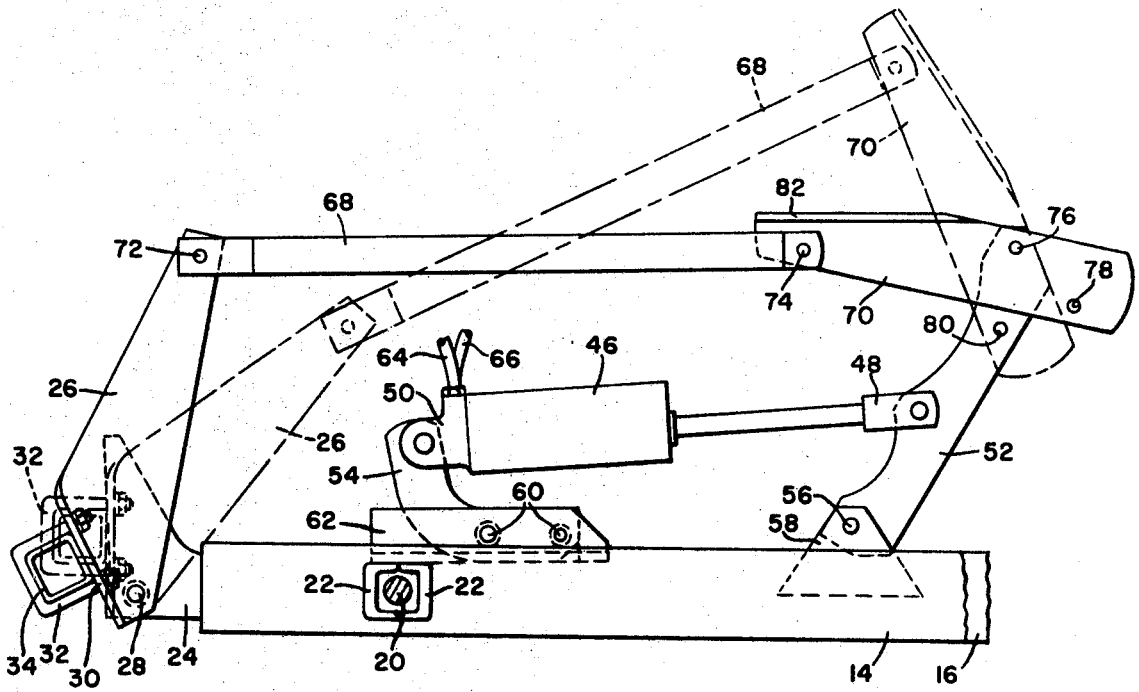
FIG. 2 is an enlarged side elevation view of the lift system, the solid lines illustrating the lift system in its field transport position, and the dotted lines illustrating the lift system in its road transport position.

The lever arm 52 is of such a length that upon full extension and retraction of the hydraulic cylinder 46 the tool bar 34 is moved between its normal working position illustrated in FIG. 1 and a field transport position illustrated in full lines in FIG. 2. When the tool bar is in its field transport position, the support arms 40 extend upwardly and rearwardly at an angle of approximately 45°, and suspend the tools above the ground surface a sufficient distance to enable the implement to be turned around at the ends of the fields and to cross waterways and the like. Also, when the support arms 40 extend at the 45° angle, the tools are raised a sufficient amount to release any trash collected by the tools.

The implement could also be transported from field to field when in the field transport position, but the width of the tool bar and extension bars presents practical limitations when attempting to move through gates or along roads. Therefore, it is desirably to fold the extension bars 36 inwardly about the axes of the hinges 38. When the drawbar is in the field transport position, the axes of the hinges 38 also extend upwardly and rearwardly at an angle of 45°, and therefore it would be necessary to lift the drawbar extensions 36 and the tools mounted thereon upwardly in order to fold the drawbar extensions 36 about the axes of the hinges 38. However, by rotating the drawbar 32 through an additional 45° to a road transport position illustrated in broken lines in FIG. 2, the axes of the hinges 38 are positioned in a vertical attitude so that the drawbar extension 36 by folded forwardly in a horizontal plane. For the purpose of moving the drawbar to the road transport position, the second link 70 can be rigidly secured to the lever arm 52 to form an extension thereof so that upon full extension and retraction of the hydraulic cylinder 46 the drawbar is moved between the working position and the road transport position. To this end, the second link 70 is provided with an aperture 78 near its second end, and the lever arm 52 is provided with a corresponding aperture 80 spaced inwardly from its upper end. By aligning the apertures 78 and 80 and inserting a pin therethrough, the link 70 is made rigid with the lever arm 52.

When the link 70 is rigid with the arm 52, it forms an obtuse angle therewith so that, when the drawbar is lowered to its normal working position by retraction of the hydraulic cylinder 46 and rearward movement of the lever arm 52, the link 70 assumes substantially the same position as it does when it is only pivotally connected to the lever arm 52. Therefore, whenever the tool bar is in its normal working position, the apertures 78 and 80 in the link 70 and lever arm 52 in substantial alignment, so it is a simple matter to insert a pin therethrough or remove a pin therefrom. Thus, it is a single-step operation to conditions the lift linkage to move the tool bar to either the field transport position or road transport position upon full extension of the hydraulic cylinder, and this single operation is accomplished either by the insertion of a pin into the apertures 78 and 80, or the removal of a pin from the apertures 78 and 80.

When the link 70 is only pivotally connected to the lever arm 52 and the drawbar is lowered to the working position, the links 68 and 70 have a tendency to buckle downwardly due to their pivotal connection. If the links were allowed to buckle an excessive amount, they could drop down and damage the cylinder 46 or hoses 64 and 66. However, excessive buckling movement of the links is prevented by transversely extending flanges 82 provided along the upper edge of the link 70 which will engage the links 68 whenever any buckling movement occurs.

Under certain conditions the resistance of the tools 44 to movement to the ground may attempt to move the drawbar 34 from its normal working position. However, this movement is resisted by the hydraulic lift system. When the second link 70 is rigid with lever arm 52, the hydraulic cylinder naturally holds the drawbar in its normal working position. When the second link 70 is only pivotally connected to lever arm 52, the drawbar could move from its working position by buckling the links 68 and 70 about the pivot pin 74. As previously mentioned, the flanges 82 prevent downward buckling between the links 68 and 70. Upward buckling of the links 68 and 70 is prevented by positioning of the flanges 82 sufficient distance above the pivot pin 74 so that they will not engage the link 68 until sufficient downward buckling to move the pivot pin 74 below the centers of the pivot pins 72 and 76 has occurred. Thus, as soon as there is a slight amount of slack in the lift linkage, the links 68 and 70 will buckle downwardly to the overcenter position and resist any movement of the drawbar 34 from its working position.

From the foregoing description of construction and operation, it can be seen that the present invention provides a hydraulic lift system for implement carriers which is extremely simple and which includes a simple adjustment for raising the tools mounted thereon to either a field transport position or a road transport position.

Although only a single preferred embodiment of the invention has been illustrated and described, various modifications within the spirit and scope of the invention will be obvious to those skilled in the art, and can be made without departing from the underlying principles of the invention.

I claim:

1. An implement carrier comprising: a transversely extending implement-supporting frame; a draft frame securable to a propelling vehicle; means connecting the implement-supporting frame to the draft frame for movement about a transverse axis between a lowered groundworking position and raised field and road transport positions; rock arm means secured to the implement-supporting frame; lever arm means having one end pivotally connected to the draft frame; an extensible and retractable hydraulic cylinder anchored between the draft frame and lever arm means; first link means pivotally connected to the rock arm means; second link means pivotally connected to the first link means and the lever arm means so that upon full extension and retraction of the hydraulic cylinder the implement-supporting frame is pivoted between its working and field transport positions; and releasable means for rigidly securing the second link means to the lever arm means so that the second link means forms an extension of the lever arm means and upon full extension and retraction of the hydraulic cylinder the implement-supporting frame is pivoted between its working and road transport positions.

2. The implement carrier set forth in claim 1 wherein the releasable means includes pin means insertable through apertures provided in the second link means and lever arm means.

3. The implement carrier set forth in claim 2 wherein the second link means is provided with abutment means which contacts the second link means and limits buckling movement between the first and second links when the second link means is free to pivot with respect to the lever arm means.

4. The implement carrier set forth in claim 2 wherein the lever arm means extends generally upwardly from its pivoted connection with the draft frame and extension and retraction of the hydraulic cylinder moves the lever arm means fore and aft to opposite sides of a vertical position, and the second link means forms an obtuse angle with the lever arm means when rigidly secured thereto so that when the lever arm means is moved aft of the vertical position to move the implement-supporting frame to its working position, the second link means is in substantial alignment with the first link means whereby, whenever the implement supporting frame is in its working position, the apertures provided in the second link means and lever arm means are in substantial alignment to facilitate insertion and removal of the pin means.

5. An implement carrier comprising: a wheeled cart adapted to be connected to a propelling vehicle; a drawbar mounted on the cart for movement about a horizontal axis between a working position and field and road transport positions; a plurality of elongated implement-supporting arms, each having one end secured to drawbar; said arms extending generally vertically when the drawbar is in the road transport position and obliquely to the horizontal when the drawbar is in the field transport position; the drawbar including a central member and a pair of extension members pivotally connected to the ends of the center member for vertical swinging movement when the drawbar is in the working position and horizontal swinging movement when the drawbar is in the road transport position; and means for moving the drawbar between the working position and either of the field and road transport positions including a rock arm connected to the drawbar, a lever arm pivotally mounted on the cart, first and second link means pivotally connected to each other and to the rock arm and lever arm, respectively, an extensible and retractable hydraulic cylinder operatively connected between the cart and lever arm, and releasable locking means for rigidly securing the second link means to the lever arm to form an extension thereof.

6. The implement carrier set forth in claim 5 wherein the second link means and lever arm are provided with corresponding apertures with at least one of the apertures being spaced from the end of the second link means or lever arm, and the releasable locking means includes removable pin means insertable through the apertures when the apertures are aligned.